(12) United States Patent  (10) Patent No.: US 9,213,153 B2
Morioka  (45) Date of Patent: Dec. 15, 2015

(54) LIGHT RECEPTACLE AND OPTICAL MODULE EQUIPPED WITH SAME

(75) Inventor: Shimpei Morioka, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/130,295

(22) PCT Filed: Jul. 13, 2012

(86) PCT No.: PCT/JP2012/067910
§ 371 (c)(1),
(2), (4) Date: Dec. 30, 2013

(87) PCT Pub. No.: WO2013/011937
PCT Pub. Date: Jan. 24, 2013

(65) Prior Publication Data
US 2014/0133802 A1  May 15, 2014

(30) Foreign Application Priority Data

Jul. 15, 2011  (JP) ................................. 2011-156708

(51) Int. Cl.
*G02B 6/32* (2006.01)
*G02B 6/42* (2006.01)

(52) U.S. Cl.
CPC ............ *G02B 6/4214* (2013.01); *G02B 6/4286* (2013.01)

(58) Field of Classification Search
CPC ...... G02B 6/4206; G02B 6/32; G02B 6/3865; G02B 6/4263; G02B 6/4292; G02B 6/4214; G02B 6/4286
USPC ................................................ 385/33, 88, 93
See application file for complete search history.

(56) References Cited

U.S. PATENT DOCUMENTS 4,198,788 A * 4/1980 Fleetwood et al. ............. 451/41
5,568,462 A * 10/1996 Park ........................... 369/44.23
(Continued)

FOREIGN PATENT DOCUMENTS

JP  64-076430 A  3/1989
JP  2000-340877 A  12/2000
(Continued)

OTHER PUBLICATIONS

International Search Report (ISR) mailed Aug. 14, 2012, issued for International Application No. PCT/JP2012/067910.
(Continued)

*Primary Examiner* — Peter Radkowski
(74) *Attorney, Agent, or Firm* — Law Office of Katsuhiro Arai

(57) ABSTRACT

An optical receptacle is disposed between a photoelectric conversion device and an optical fiber, in which photoelectric conversion device a light-emitting element and a light-receiving element that receives monitor light for monitoring light emitted from the light-emitting element are mounted on substrate. Light of the light-emitting element that has been incident on a first surface is reflected by a first reflective surface, and then is separated by a light separating section into monitor light and light to be coupled with a fiber end. The monitor light is emitted from the first surface towards the light-receiving element side. The light to be coupled with the fiber end is emitted from a second surface towards the fiber end side. A traveling direction of the light reaching the second surface from the first reflective surface is maintained at a reflection direction of the first reflective surface.

14 Claims, 3 Drawing Sheets

(56) References Cited

U.S. PATENT DOCUMENTS

| | | | |
|---|---|---|---|
| 5,825,952 A * | 10/1998 | Kawanishi et al. | 385/47 |
| 6,071,426 A * | 6/2000 | Lee et al. | 216/24 |
| 6,314,223 B1 * | 11/2001 | Te Kolste et al. | 385/48 |
| 6,334,716 B1 * | 1/2002 | Ojima et al. | 385/89 |
| 6,368,890 B1 | 4/2002 | Wickstroem et al. | |
| 6,393,169 B1 * | 5/2002 | Paniccia et al. | 385/14 |
| 6,404,959 B1 * | 6/2002 | Te Kolste et al. | 385/48 |
| 6,414,779 B1 * | 7/2002 | Mandella et al. | 359/212.1 |
| 6,496,621 B1 * | 12/2002 | Kathman et al. | 385/31 |
| 6,522,444 B2 * | 2/2003 | Mandella et al. | 359/214.1 |
| 6,530,697 B1 * | 3/2003 | Johnson et al. | 385/88 |
| 6,591,043 B2 * | 7/2003 | Te Kolste et al. | 385/48 |
| 6,678,292 B2 | 1/2004 | Wickstroem et al. | |
| 6,751,373 B2 * | 6/2004 | Jeong | 385/24 |
| 6,812,161 B2 * | 11/2004 | Heremans et al. | 438/782 |
| 6,832,859 B1 * | 12/2004 | Bell et al. | 385/78 |
| 6,952,507 B2 * | 10/2005 | Johnson et al. | 385/31 |
| 6,967,754 B2 * | 11/2005 | Bratt et al. | 359/15 |
| 7,019,883 B2 * | 3/2006 | Moon et al. | 359/290 |
| 7,221,823 B2 * | 5/2007 | Kathman et al. | 385/33 |
| 7,343,069 B2 * | 3/2008 | Kathman et al. | 385/39 |
| 7,369,315 B2 * | 5/2008 | Shen | 359/629 |
| 7,529,446 B2 * | 5/2009 | Kathman et al. | 385/33 |
| 7,773,836 B2 * | 8/2010 | De Dobbelaere | 385/14 |
| 7,780,302 B2 * | 8/2010 | Wang | 359/871 |
| 8,351,744 B2 * | 1/2013 | Travis et al. | 385/43 |
| 8,477,298 B2 * | 7/2013 | Sutherland | 356/138 |
| 8,529,139 B2 * | 9/2013 | Kathman et al. | 385/88 |
| 2002/0150341 A1 * | 10/2002 | Te Kolste et al. | 385/48 |
| 2002/0176151 A1 * | 11/2002 | Moon et al. | 359/298 |
| 2002/0181046 A1 * | 12/2002 | Jeong | 359/124 |
| 2003/0072526 A1 * | 4/2003 | Kathman et al. | 385/31 |
| 2003/0075723 A1 * | 4/2003 | Heremans et al. | 257/98 |
| 2003/0081901 A1 * | 5/2003 | Gage et al. | 385/48 |
| 2003/0142903 A1 * | 7/2003 | Johnson et al. | 385/31 |
| 2004/0004745 A1 * | 1/2004 | Bratt et al. | 359/15 |
| 2004/0202477 A1 * | 10/2004 | Nagasaka et al. | 398/138 |
| 2004/0208595 A1 * | 10/2004 | Mok et al. | 398/128 |
| 2006/0002651 A1 * | 1/2006 | Shimizu et al. | 385/14 |
| 2006/0180744 A1 * | 8/2006 | Shen | 250/208.1 |
| 2007/0104416 A1 * | 5/2007 | Shimizu et al. | 385/14 |
| 2007/0223094 A1 * | 9/2007 | Kathman et al. | 359/558 |
| 2008/0142815 A1 | 6/2008 | Morioka | |
| 2008/0159695 A1 * | 7/2008 | Kathman et al. | 385/33 |
| 2009/0016676 A1 * | 1/2009 | Morioka | 385/27 |
| 2009/0154877 A1 * | 6/2009 | Morioka | 385/39 |
| 2009/0226134 A1 * | 9/2009 | Kathman et al. | 385/33 |
| 2010/0008675 A1 * | 1/2010 | De Dobbelaere | 398/135 |
| 2010/0166430 A1 * | 7/2010 | Alten | 398/135 |
| 2011/0075132 A1 * | 3/2011 | Sutherland | 356/138 |
| 2012/0076456 A1 * | 3/2012 | Kathman et al. | 385/33 |
| 2014/0112619 A1 * | 4/2014 | Kathman et al. | 385/31 |

FOREIGN PATENT DOCUMENTS

| | | |
|---|---|---|
| JP | 2004-221420 A | 8/2004 |
| JP | 2006-017885 A | 1/2006 |
| JP | 2007-066880 A | 3/2007 |
| JP | 2008-151894 A | 7/2008 |
| JP | 2011-133807 A | 7/2011 |
| WO | 2011/077723 A1 | 6/2011 |

OTHER PUBLICATIONS

A Notification of Reasons for Refusal issued by the Japanese Patent Office, mailed Feb. 17, 2015, for Japanese counterpart application No. 2011-156708.

* cited by examiner

_US 9,213,153 B2_

LIGHT RECEPTACLE AND OPTICAL MODULE EQUIPPED WITH SAME

This application is the U.S. National Phase under 35 U.S.C. §371 of International Application PCT/JP2012/067910, filed Jul. 13, 2012, which claims priority to Japanese Patent Application No. 2011-156708, filed Jul. 15, 2011. The International Application was published under PCT Article 21(2) in a language other than English.

TECHNICAL FIELD

The present invention relates to an optical receptacle and an optical module including the optical receptacle. In particular, the present invention relates to an optical receptacle suitable for optically coupling a light-emitting element and an end face of an optical fiber, and optical module including the optical receptacle.

BACKGROUND ART

Since the past, an optical module has been used in optical communication using optical fibers, the optical module including a light-emitting element such as a surface light-emitting laser (for example, a vertical cavity surface emitting laser [VCSEL])

In this type of optical module, an optical module component referred to as an optical receptacle is used. The optical receptacle is used in optical transmission via optical fibers by light that includes communication information and has been emitted from the light-emitting element being coupled with an end face of the optical fiber, via a lens.

In addition, since the past, various proposals have been made regarding the optical module to monitor the light (intensity and amount of light) emitted from the light-emitting element, for the purpose of stabilizing output characteristics of the light-emitting element against temperature changes.

For example, Patent Literature 1 and Patent Literature 2 propose the use of a photoelectric conversion device in which a light-receiving element for monitoring is enclosed together with a light-emitting element in a package referred to as a TO-CAN. Some of the outgoing light from the light-emitting element is reflected to the light-receiving element side as monitor light at a glass window of the package.

However, in a CAN-package type photoelectric conversion device such as this, during high-frequency drive, crosstalk occurs in some instances as a result of electromagnetic waves leaking from a section of wiring connected to the light-emitting element. In such instances, support of high-speed communication of 10 Gbps or more becomes difficult. Furthermore, in the module using the CAN package, the maximum diameter of the optical receptacle is 6 mm to 7 mm in, for example, a CAN referred to as TO-46. Therefore, size reduction is difficult.

On the other hand, in a substrate-mounted photoelectric conversion device in which the light-emitting element is mounted on a circuit board, unlike the CAN-package type, there are no issues regarding crosstalk. In addition, there are advantages, such as reduced number of components, reduced cost, and reduced size. However, because a glass window is not provided, it is difficult to include a function for generating monitor light on the photoelectric conversion device side.

Therefore, for example, as shown in Patent Literature 3, proposals have been made to actualize stable high-speed communication accompanying monitoring by a reflective surface for reflecting some of the outgoing light from the light-emitting element towards the light-receiving element side as monitor light being formed on the optical receptacle side to support the substrate-mounted photoelectric conversion device.

PRIOR ART LITERATURES

Patent Literature

Patent Literature 1: Japanese Patent Laid-open Publication No. 2000-340877
Patent Literature 2: Japanese Patent Laid-open Publication No. 2004-221420
Patent Literature 3: Japanese Patent Laid-open Publication No. 2008-151894

SUMMARY OF INVENTION

Problem to be Solved by the Invention

The invention described in above-described Patent Literature 3 is configured such that, after the light from the light-emitting element has passed through the optical receptacle, the light is extracted in a direction perpendicular to the substrate of the photoelectric conversion device at the end face of the optical fiber.

However, depending on the format of use of the optical module, in some instances, the light from the light-emitting element is required to be extracted in a direction along the substrate at the end face of the optical fiber. In such instances, to easily and appropriately actualize optical transmission accompanying monitoring, a new method is required that is different from the invention described in Patent Literature 3 and in which the light extraction direction differs.

Therefore, the present invention has been achieved in light of the above-described issues. An object of the present invention is to provide an optical receptacle capable of easily and appropriately actualizing optical transmission accompanying monitoring, in which light from a light-emitting element is extracted in a direction along a substrate at an end face of an optical fiber, and an optical module including the optical receptacle.

Means for Solving Problem

To achieve the above-described object, an optical receptacle according to a first aspect is an optical receptacle that is disposed between a photoelectric conversion device and an optical fiber, in which photoelectric conversion device a light-emitting element and a light-receiving element that receives monitor light for monitoring light emitted from the light-emitting element are mounted on a substrate, and the optical receptacle is capable of optically coupling the light-emitting element and an end face of the optical fiber. The optical receptacle includes: a first surface of an optical receptacle main body on which the light from the light-emitting element is incident and from which the monitor light is emitted towards the light-receiving element; a first reflective surface that is disposed on a side opposite to the first surface such as to have a predetermined slope angle in relation to the first surface and such that the light of the light-emitting element that has been incident on the first surface is incident thereon, and that reflects the incident light of the light-emitting element; a light separating section that is disposed on the side opposite to the first surface and towards a reflection direction of the light of the light-emitting element in relation to the first reflective surface, and that separates the light of the light-emitting element that has been reflected by the first reflective surface into the monitor light that advances towards the first surface and light to be coupled with the end face of the optical fiber; and a second surface of the optical receptacle main body from which the light to be coupled with the end face of the optical fiber that has been separated by the light separating section is emitted towards the end face of the optical fiber. In the optical receptacle, the light reaching the second surface from the first reflective surface is such that a traveling direction between the first reflective surface and the second surface is maintained at the reflection direction of the first reflective surface.

In the invention according to the first aspect, the light of the light-emitting element that has been incident on the first surface can be reflected by the first reflective surface. Then, the light of the light-emitting element can be separated into the monitor light and the light to be coupled with the end surface of the optical fiber by the light separating section. The monitor light can be emitted from the first surface towards the light-receiving element side. The light to be coupled with the end face of the optical fiber can be emitted from the second surface towards the side of the end face of the optical fiber. Therefore, acquisition of monitor light and extraction of the light of the light-emitting element in the direction along the substrate at the end face of the optical fiber can be appropriately performed. In addition, the traveling direction between the first reflective surface and the second surface of the light reaching the second surface from the first reflective surface can be maintained at the reflection direction of the first reflective surface. Therefore, a simple optical path design becomes possible that does not require consideration of refraction of the light reaching the second surface from the first reflective surface occurring within the optical receptacle.

In addition, an optical receptacle according to a second aspect is the optical receptacle according to the first aspect in which, further, the light separating section has a second light reflective surface that is disposed such as to have a predetermined slope angle in relation to the first surface and such that a portion of light of the light of the light-emitting element reflected by the first reflective surface is incident thereon, the portion of light incident on the second reflective surface is reflected by the second reflective surface as the monitor light, and light of the light of the light-emitting element that has been reflected by the first reflective surface and has not been incident on the second reflective surface is advanced as is towards the second surface side.

In the invention according to the second aspect, the light separating section can be easily configured by the second reflective surface. In addition, the monitor light can be easily generated with certainty through use of reflection by the second reflective surface. Separation of the light to be coupled with the end face of the optical fiber can be easily actualized with certainty by the light of the light-emitting element that has been reflected by the first reflective surface being partially prevented from being incident on the second reflective surface. Furthermore, a light amount ratio of the monitor light and the light to be coupled with the end face of the optical fiber can be easily adjusted by the design of the incidence area of the light of the light-emitting element in relation to the second reflective surface.

Furthermore, an optical receptacle according to a third aspect is the optical receptacle according to the second aspect in which, further, the second reflective surface is composed of a sloped surface of the optical receptacle main body having a slope angle such that the portion of light is incident at an angle of incidence greater than the critical angle, and totally reflects the incident portion of light as the monitor light.

In the invention according to the third aspect, the second reflective surface can be formed into a total reflective surface composed of only the sloped surface of the optical receptacle main body. Therefore, the number of components and cost can be reduced, and manufacturing can be facilitated.

Still further, an optical receptacle according to a fourth aspect is the optical receptacle according to the second aspect in which, further, the second reflective surface is formed by the sloped surface of the optical receptacle main body being coated by a reflective film.

In the invention according to the fourth aspect, the slope angle of the second reflective surface is not restricted to that ensuring an angle of incidence of the light of the light-emitting element that is greater than the critical angle. Therefore, the degree of freedom of design regarding the outgoing direction of the monitor light and the placement position of the light-receiving element can be widened.

Still further, an optical receptacle according to a fifth aspect is the optical receptacle according to any one of the first to fourth aspects in which, further, the first reflective surface is composed of a sloped surface of the optical receptacle main body having a sloped angle such that the light of the light-emitting element that has been incident on the first surface is incident at an angle of incidence greater than the critical angle, and totally reflects the incident light of the light-emitting element.

In the invention according to the fifth aspect, the first reflective surface can be formed into a total reflective surface composed of only the sloped surface of the optical receptacle main body. Therefore, the number of components and cost can be reduced, and manufacturing can be facilitated.

In addition, an optical receptacle according to the sixth aspect is the optical receptacle according to any one of the first to second aspects in which, further, the first reflective surface is formed by the sloped surface of the optical receptacle main body being coated with a reflective film.

In the invention according to the sixth aspect, the slope angle of the first reflective surface is not restricted to that ensuring an angle of incidence of the light of the light-emitting element that is greater than the critical angle. Therefore, the degree of freedom of design regarding the reflection direction of the light of the light-emitting element at the first reflective surface can be widened.

Furthermore, an optical receptacle according to a seventh aspect is the optical receptacle according to any one of the first to sixth aspects in which, further, a first lens face for enabling the light of the light-emitting element to be incident towards the first reflective surface is formed on the first surface, and a second lens face for emitting the light to be coupled with the end face of the optical fiber towards the end face of the optical fiber is formed on the second surface.

In the invention according to the seventh aspect, optical coupling of the light-emitting element and the end face of the optical fiber can be efficiently performed by the first lens face and the second lens face.

Still further, an optical receptacle according to an eighth aspect is the optical receptacle according to the seventh aspect in which, further, a third lens face for emitting the monitor light towards the light-receiving element is formed on the first surface.

In the invention according to the eighth aspect, the monitor light can be efficiently coupled with the light-receiving element by the third lens face.

In addition, an optical module according to a ninth aspect includes an optical receptacle according to any one of the first to eighth aspects, and a photoelectric conversion device according to the first aspect.

In the invention according to the ninth aspect, acquisition of monitor light and extraction of the light of the light-emitting element in the direction along the substrate at the end face of the optical fiber can be appropriately performed. In addition, a simple optical path design becomes possible that does not require consideration of refraction of the light reaching the second surface from the first reflective surface occurring within the optical receptacle.

Furthermore, an optical module according to a tenth aspect includes an optical receptacle according to any one of the second to fourth aspects, and a photoelectric conversion device according to the first aspect. In the optical module, an optical receptacle main body is formed by a resin material. In expectation of reflection of the light of the light-emitting element by a round shape that may be formed in an end portion of a second reflective surface of the optical receptacle on a first surface side, to prevent the reflected light from being incident on a light-receiving element and the light-emitting element of the photoelectric conversion device, the size of the light-receiving element, the position of the light-emitting element, and spacing between a first reflective surface and the second reflective surface of the optical receptacle are set.

In the invention according to the tenth aspect, acquisition of monitor light and extraction of the light of the light-emitting element in the direction along the substrate at the end face of the optical fiber can be appropriately performed. In addition, a simple optical path design becomes possible that does not require consideration of refraction of the light reaching the second surface from the first reflective surface occurring within the optical receptacle. Furthermore, the light separating section can be easily configured, the monitor light can be easily generated with certainty, and separation of the light to be coupled with the end face of the optical fiber can be easily actualized with certainty. Moreover, a light amount ratio of the monitor light and the light to be coupled with the end face of the optical fiber can be easily adjusted. In addition, the number of components and cost can be reduced, manufacturing can be facilitated, and the degree of freedom of design regarding the outgoing direction of the monitor light and the placement position of the light-receiving element can be widened. Furthermore, even when a round shape is formed at the tip of a shape transfer portion of the second reflective surface in a mold for performing resin molding of the optical receptacle main body as a result of dimensional error or drooping caused by abrasion, corrosion, and the like, and the round shape is transferred to the molded product as the shape of the second reflective surface, design can be made in anticipation of the round shape, such that reflected light from the round shape is not incident on the light-emitting element and the light-receiving element as stray light. Therefore, the optical receptacle main body can be manufactured without issues regarding optical performance using inexpensive resin materials.

Still further, an optical module according to an eleventh aspect is the optical module according to the tenth aspect in which, further, the first reflective surface is composed of a sloped surface of the optical receptacle main body having a sloped angle such that the light of the light-emitting element that has been incident on the first surface is incident at an angle of incidence greater than the critical angle, and totally reflects the incident light of the light-emitting element.

In the invention according to the eleventh aspect, the number of components and cost can be reduced, manufacturing can be facilitated.

In addition, an optical module according to a twelfth aspect is the optical module according to the tenth aspect in which, further, the first reflective surface is formed by the sloped surface of the optical receptacle main body being coated with a reflective film.

In the invention according to the twelfth aspect, the degree of freedom of design regarding the reflection direction of the light of the light-emitting element at the first reflective surface can be widened.

Furthermore, an optical module according to a thirteenth aspect is the optical module according to any one of the tenth to twelfth aspects in which, further, a first lens face for enabling the light of the light-emitting element to be incident towards the first reflective surface is formed on the first surface, and a second lens face for emitting the light to be coupled with the end face of the optical fiber towards the end face of the optical fiber is formed on the second surface of the optical receptacle.

In the invention according to the thirteenth aspect, optical coupling of the light-emitting element and the end face of the optical fiber can be efficiently performed.

Still further, an optical module according to a fourteenth aspect is the optical module according to the thirteenth aspect in which, further, a third lens face for emitting the monitor light towards the light-receiving element is formed on the first surface.

In the invention according to the fourteenth aspect, the monitor light can be efficiently coupled with the light-receiving element.

Effect of the Invention

In the present invention, optical transmission accompanying monitoring in which the light from the light-emitting element is extracted in a direction along the substrate at the end face of the optical fiber can be easily and appropriately actualized.

BEST MODE(S) FOR CARRYING OUT THE INVENTION

An embodiment of an optical receptacle and an optical module including the optical receptacle of the present invention will be described with reference to FIG. 1 to FIG. 6.

Figure 1:
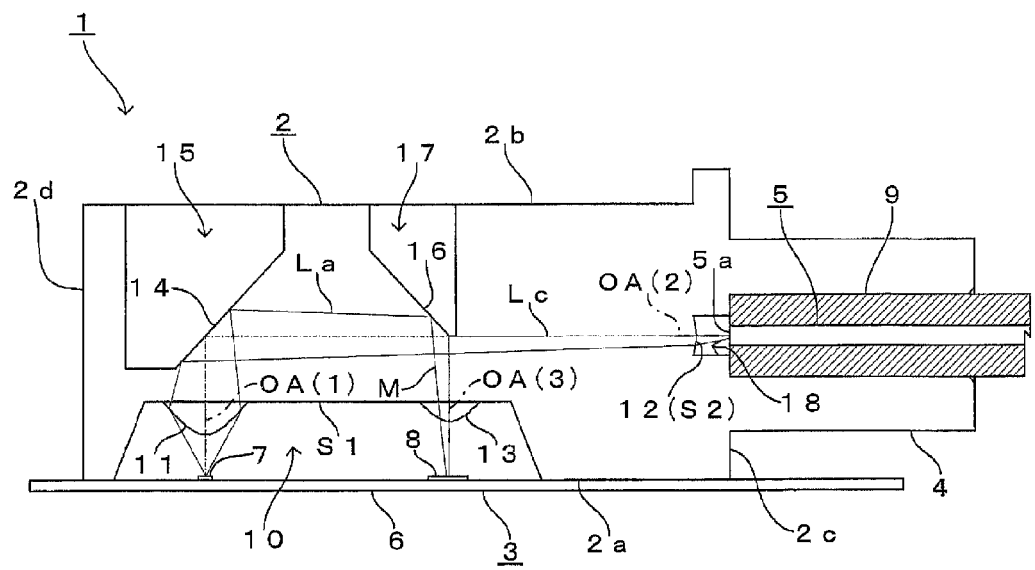
[FIG. 1] A schematic configuration diagram of an optical receptacle and an optical module according to an aspect of the present invention.
Figure 2:
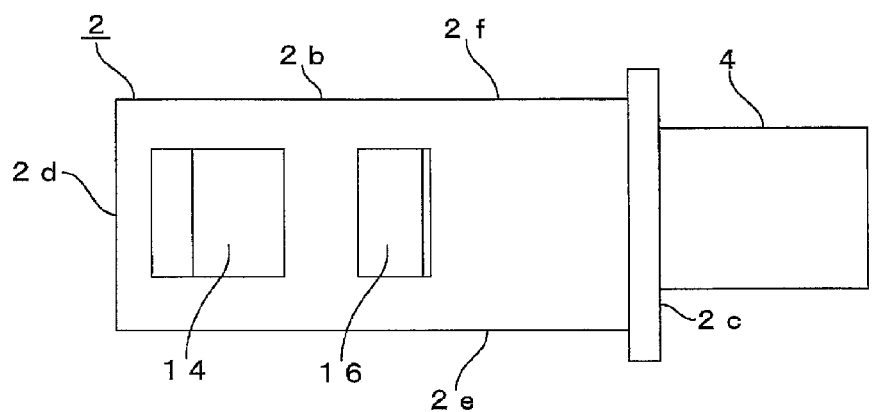
[FIG. 2] A planar view of the optical receptacle shown in FIG. 1.
Figure 3:
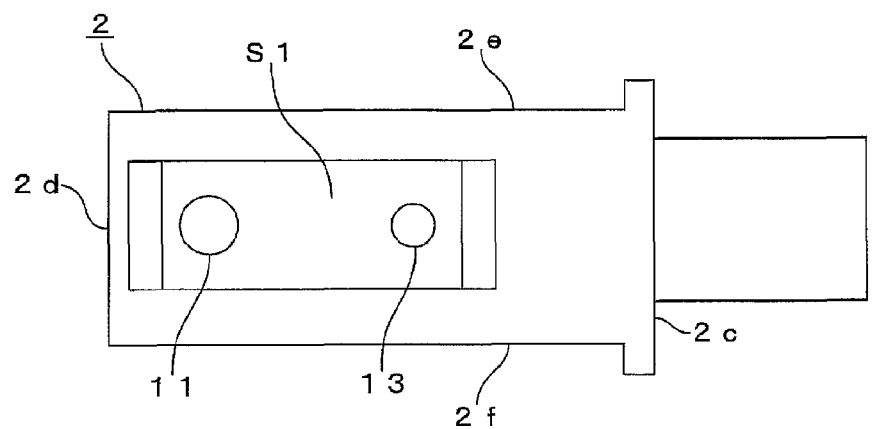
[FIG. 3] A bottom view of the optical receptacle shown in FIG. 1.

FIG. 1 is a schematic configuration diagram showing an overview of an optical module 1 according to the present embodiment together with a vertical cross-sectional view of an optical receptacle 2 according to the present embodiment. In addition, FIG. 2 is a planar view of the optical receptacle 2 shown in FIG. 1. Furthermore, FIG. 3 is a bottom view of the optical receptacle 2 shown in FIG. 1.

As shown in FIG. 1, the optical receptacle 2 (optical receptacle main body) according to the present embodiment is disposed between a photoelectric conversion device 3 and an optical fiber 5.

Here, the photoelectric conversion device 3 in FIG. 1 is a substrate-mounted photoelectric conversion device 3. In other words, as shown in FIG. 1, the photoelectric conversion device 3 has a single light-emitting element 7 on a surface (top surface) of a semiconductor substrate (circuit board) 6 on the optical receptacle 2 side, the light-emitting element 7 emitting a laser light La in a direction perpendicular to this surface (upwards). The semiconductor substrate 6 is disposed in parallel with a lower end surface 2a of the optical receptacle 2. The light-emitting element 7 configures the above-described VCSEL. In addition, the photoelectric conversion device 3 has a single light-receiving element 8 on the surface of the semiconductor substrate 6 on the optical receptacle 2 side, in a position to the right of the light-emitting element 7 in FIG. 1, the light-receiving element 8 receiving a monitor light M for monitoring output (such as intensity and amount of light) of the laser light La emitted from the light-emitting element 7. The light-receiving element 8 may be a photodetector. Furthermore, electronic components, such as a control circuit that controls the output of the laser light La emitted from the light-emitting element 7 based on the intensity and the amount of light of the monitor M received by the light-receiving element 8, are mounted on the surface of the semiconductor substrate 6 on the optical receptacle 2 side (not shown). The electronic components are electrically connected to the light-emitting element 7 and the light-receiving element 8 by wires. The photoelectric conversion device 3 such as this, together with the optical receptacle 2, configures the optical module 1 by, for example, the photoelectric conversion device 3 being attached to the optical receptacle 2 by a known fixing means, such as an adhesive (for example, a thermoset or ultra-violet hardening resin) disposed between the semiconductor substrate 6 and the optical receptacle 2.

In addition, as shown in FIG. 1, a section of the optical fiber 5 on an end face 5a side that has a predetermined length is detachably attached, together with a circular-cylindrical ferrule 9 that holds this section, in a cylindrical optical fiber attaching section 4 that is formed in the optical receptacle 2. In this attached state, the section of the optical fiber 5 on the end face 5a side is parallel with the semiconductor substrate 6. The optical fiber 5 may be either a single-mode optical fiber or a multi-mode optical fiber.

In a state in which the optical receptacle 2 is disposed between the photoelectric conversion device 3 and the optical fiber 5 such as those described above, the optical receptacle 2 optically couples the light-emitting element 7 and the end face 5a of the optical fiber 5.

The optical receptacle 2 will be described in further detail. As shown in FIG. 1, the outer shape of a main section of the optical receptacle 2 having various optical surfaces is formed into a substantially rectangular parallelepiped shape. In other words, as shown in FIG. 1 to FIG. 3, the main section of the optical receptacle 2 configures an overall outer shape by the lower end surface 2a, an upper end surface 2b, a right end surface 2c, a left end surface 2d, a front end surface 2e, and a rear end surface 2f. The upper and lower end surfaces 2a and 2b are parallel with each other. The left and right end surfaces 2c and 2d are also parallel with each other. Furthermore, the upper and lower end surfaces 2a and 2b and the left and right end surfaces 2c and 2d are perpendicular to each other. The above-described optical fiber attaching section 4 is formed such as to extend towards the right side from the right end face 2c.

As shown in FIG. 1, a first recessing section 10 is formed in a position on the lower end surface 2a of the optical receptacle and towards the left end surface 2d, the first recessing section 10 having a substantially trapezoidal cross-sectional shape that recesses upwards in relation to the lower end surface 2a. An inner bottom surface of the first recessing section 10 is a first surface S1 on which the laser light La from the light-emitting element 7 is incident and from which the monitor light M is emitted towards the light-receiving element 8. As shown in FIG. 1, the first surface S1 is formed in parallel with the lower end surface 2a. In a position near the left end portion in FIG. 1 and FIG. 3 on the first surface S1, such as that described above, a single first lens face 11 is formed as shown in FIG. 1 and FIG. 3. As shown in FIG. 1 and FIG. 3, the first lens face 11 is formed having a circular planar shape, and is formed into a spherical or aspherical convex lens face of which the convex surface faces the light-emitting element 7 side. An optical axis OA(1) on the first lens face 11 preferably matches a center axis (central ray) of the laser light La (light beam) emitted from the light-emitting element 7. In addition, the axial direction of the optical axis OA(1) may be perpendicular to the first surface S1.

As shown in FIG. 1, in a state in which the photoelectric conversion device 3 is attached to the optical receptacle 2, the laser light La emitted from the light-emitting element 7 is incident on the first lens face 11, such as that described above, from below. Then, the first lens face 11 converges the incident laser light La and advances the laser light La into the interior of the optical receptacle 2. The first lens face 11 may be formed having a surface shape that collimates or disperses the laser light La.

In addition, as shown in FIG. 1 and FIG. 2, a first reflective surface 14 is formed in a position on the side opposite to the first surface S1 (above in FIG. 1) and towards the direction in which the laser light La advances in relation to the first lens face 11 (a position directly above in FIG. 1), the first reflective surface 14 having a predetermined slope angle in relation to the first surface S1, such as to slope towards the right side as the first reflective surface 14 becomes higher. As shown in FIG. 1, the first reflective surface 14 is composed of only an inner sloped surface of a second recessing section 15 that has a substantially trapezoidal cross-sectional shape formed recessing downwards on the upper end surface 2b.

As shown in FIG. 1, the laser light La of the light-emitting element 7 that has been incident on the first lens face 11 is internally incident on the first reflective surface 14, such as that described above, at an angle of incidence that is greater than the critical angle from below in FIG. 1. The first reflective surface 14 then totally reflects the internally incident laser light La of the light-emitting element 7 towards the right side in FIG. 1.

In terms of simplifying design and dimensional accuracy measurement, the slope angle of the first reflective surface 14 may be 45° in the counter-clockwise direction in FIG. 1 with reference to the first surface S1 (0°). Alternatively, in terms of ensuring an angle of incidence that is greater than the critical angle for all or most of the light rays included in the converged light beam La of which the angle of incidence is not fixed, the slope angle may be greater than 45°.

Furthermore, as shown in FIG. 1 and FIG. 2, a second reflective surface 16 is disposed in a position on the side opposite to the first surface S1 and towards the direction of reflection of the laser light La of the light-emitting element 7 in relation to the first reflective surface 14 (a position on the right side), the second reflective surface 16 serving as a light separating section that separates the laser light La of the light-emitting element 7 that has been reflected by the first reflective surface 14 into the monitor light M that advances towards the first surface S1 and a laser light Lc to be coupled with the end face 5a of the optical fiber 5. As shown in FIG. 1, the second reflective surface 16 has a predetermined slope angle in relation to the first surface S1, such as to slope towards the left side as the second reflective surface 16 becomes higher. In addition, as shown in FIG. 1, the second reflective surface 16 is composed of only an inner sloped surface of a third recessing section 17 that has a substantially trapezoidal cross-sectional shape formed recessing downwards on the upper end surface 2b more shallowly than the second recessing section 15. The slope angle of the second reflective surface 16 may be 45° in the clockwise direction in FIG. 1 with reference to the first surface S1 (0°).

As shown in FIG. 1, a portion of the light on the upper side of the laser light La (light beam) of the light-emitting element 7 that has been reflected by the first reflective surface 14 is internally incident on a section of a predetermined area on the second reflective surface 16, such as that described above, on the first surface S1 side (lower end portion side), at an angle of incidence greater than the critical angle from the left side. The second reflective surface 16 totally reflects the internally incident portion of light towards the first surface S1 as the monitor light M. On the other hand, light of the laser light La of the light-emitting element 7 that has not been internally incident on the second reflective surface 16 advances towards the right side (straight advancement) while maintaining the traveling direction, as the laser light Lc to be coupled with the end face 5a of the optical fiber 5. However, the light-beam cross-section of the laser light Lc to be coupled with the end face 5a of the optical fiber 5 becomes gradually smaller in size as the laser light Lc advances to the right side, as a result of the laser light La before light separation being converged light.

Still further, as shown in FIG. 1, a fourth recessing section 18 is formed recessing towards the left side in a position on the right end surface 2c of the optical receptacle 2 facing the end face 5a of the optical fiber 5. The inner bottom surface of the fourth recessing section 18 is a single second lens face 12 that also serves as a second surface S2. The second lens face 12 is formed having a circular planar shape with a smaller diameter than that of the first lens face 11. In addition, the second lens face 12 is formed into a spherical or aspherical convex lens face of which the convex surface faces the side of the end face 5a of the optical fiber 5. An optical axis OA(2) on the second lens face 12 may match the center axis of the end face 5a of the optical fiber 5.

As shown in FIG. 1, the laser light Lc that has been separated from the monitor light M by the second reflective surface 16 and is to be coupled with the end face 5a of the optical fiber 5 is internally incident on the second lens face 12, such as that described above, from the left side. The second lens face 12 then converges the internally incident laser light Lc and emits the laser light Lc towards the end face 5a of the optical fiber 5.

In addition, as shown in FIG. 1, according to the present embodiment, in terms of the above-described configuration of the second reflective surface 16, the light that reaches the second lens face 12 (second surface S2) from the first reflective surface 14, or in other words, a series of light including the light of the laser light La that is not incident on the second reflective surface 16 and the successive laser light Lc to be coupled with the end face 5a of the optical fiber 5 is such that the traveling direction between the first reflective surface 14 and the second lens face 12 is maintained at the reflection direction of the first reflective surface 14.

Furthermore, as shown in FIG. 1, in a position on the first surface S1 near the right end portion in FIG. 1 and FIG. 3, a single third lens face 13 is formed as shown in FIG. 1 and FIG. 3. As shown in FIG. 1 and FIG. 3, the third lens face 13 is formed having a circular planar shape with a smaller diameter than that of the first lens face 11. In addition, the third lens face 13 is formed into a spherical or aspherical convex lens face of which the convex surface faces the light-receiving element 8 side. An optical axis OA(3) on the third lens face 13 may be perpendicular to the first surface S1.

As shown in FIG. 1, the monitor light M that has been reflected by the second reflective surface 16 is internally incident on the third lens face, such as that described above, from above. The third lens face 13 then converges the internally incident monitor light M and emits the monitor light M towards the light-receiving element 8.

In the above-described configuration, the laser light La of the light-emitting element 7 that has been incident on the first surface S1 is totally reflected by the first reflective surface 14. Then, the laser light La can be separated by the second reflective surface 16, serving as a light separating section, into the monitor light M and the laser light Lc to be coupled with the end face 5a of the optical fiber 5. The monitor light M can be emitted from the first surface S1 towards the light-receiving element 8 side. The laser light Lc to be coupled with the end face 5a of the optical fiber 5 can be emitted from the second surface S2 towards the side of the end face 5a of the optical fiber 5. As a result, acquisition of the monitor light M and extraction of the laser light Lc at the end face 5a of the optical fiber 5 in the direction along the substrate 6 can be easily and appropriately performed. In addition, the traveling direction between the first reflective surface 14 and the second surface S2 of the light reaching the second surface S2 from the first reflective surface 14 can be maintained at the reflection direction of the first reflective surface 14. Therefore, a simple optical path design becomes possible that does not require consideration of refraction of the light reaching the second surface S2 from the first reflective surface 14 occurring within the optical receptacle 2. Furthermore, the light separating section can be easily configured by the second reflective surface 16. Furthermore, the monitor light M can be easily generated with certainty through use of reflection by the second reflective surface 16. Separation of the laser light Lc to be coupled with the end face 5a of the optical fiber 5 can be easily actualized with certainty by the laser light La of the light-emitting element 7 that has been reflected by the first reflective surface 14 being partially prevented from being incident on the second reflective surface 16. Still further, a light amount ratio of the monitor light M and the laser light Lc to be coupled with the end face 5a of the optical fiber 5 can be easily adjusted by the design of the incidence area of the laser light La of the light-emitting element 7 in relation to the second reflective surface 16. Here, the light amount ratio may be 1:1. Alternatively, the amount of the laser light Lc may be relatively larger. In addition, according to the present embodiment, the first reflective surface 14 and the second reflective surface 16 can be formed into total reflective surfaces composed of only the sloped surfaces of the optical receptacle 2. Therefore, the number of components and cost can be reduced, and manufacturing can be facilitated. Moreover, optical coupling of the light-emitting element 7 and the end face 5a of the optical fiber 5 can be efficiently performed by the first lens face 11 and the second lens face 12. In addition, the monitor light M can be efficiently coupled with the light-receiving element 8 by the third lens face 13.

The present invention is not limited to the above-described configuration. Various variation examples can also be used.

(First Variation Example)

Figure 4:
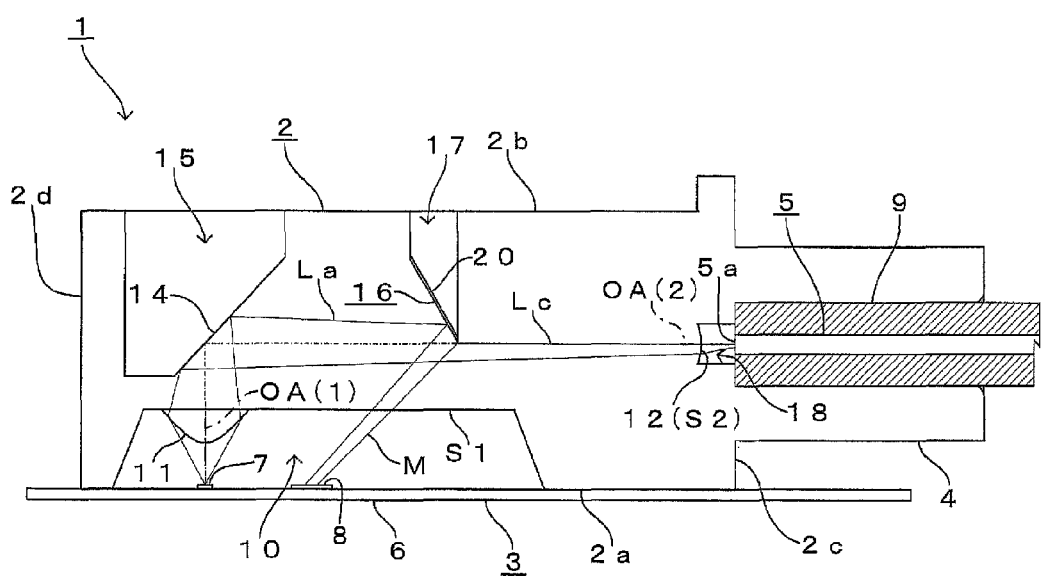
[FIG. 4] A configuration diagram of a first variation example of the present invention.

For example, as shown in FIG. 4, instead of the second reflective surface 16 being formed into a total reflective surface composed of only a sloped surface of the optical receptacle 2, as described above, the second reflective surface 16 may be formed by the sloped surface of the optical receptacle 2 being coated with a reflective film 20. As the material of the reflective film 20, Au, Ag, Al, and the like can be given.

In a configuration such as this, the slope angle of the second reflective surface 16 is not restricted to that ensuring an angle of incidence of the laser light La that is greater than the critical angle. Therefore, the degree of freedom of design regarding the outgoing direction of the monitor light M and the placement position of the light-receiving element 8 can be widened. For example, in FIG. 4, the monitor light M is emitted downward at a leftward angle in relation to the second reflective surface 16, rather than straight down as in FIG. 1. In addition, in FIG. 4, the third lens face 13 is not formed, and the monitor light M is emitted by the first surface S1.

(Second Variation Example)

Figure 5:
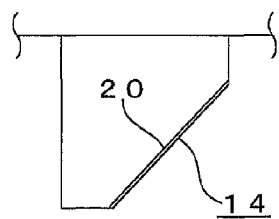
[FIG. 5] A configuration diagram of a second variation example of the present invention.

In addition, as shown in FIG. 5, the first reflective surface 14 may also be formed by a sloped surface of the optical receptacle 2 being coated by the reflective film 20, instead of the first reflective surface 14 being formed into a total reflective surface.

In a configuration such as this, the slope angle of the first reflective surface 14 is not restricted to that ensuring an angle of incidence of the laser light La that is greater than the critical angle. Therefore, the degree of freedom of design regarding the reflection direction of the laser light La of the light-emitting element 7 at the first reflective surface 14 can be widened.

(Third Variation Example)

Furthermore, in an instance in which the optical receptacle 2 is formed by an inexpensive resin material, such as polyetherimide, injection molding using a mold is performed. In this instance, the mold may be configured by, for example: a first mold having the shape transfer surface of the first recessing section 10 including the first surface S1, the first lens face 11, and the third lens face 13; a second mold having a shape transfer surface of the second recessing section 15 including the first reflective surface 14 and a shape transfer surface of the third recessing section 17 including the second reflective surface 16; and a third mold having shape transfer surfaces of the second lens face 12 (second surface S2) and the optical fiber attaching section 4.

When the optical receptacle 2 is obtained by resin molding using a mold such as that described above, a round shape may be formed at the tip of the shape transfer portion of the second reflective surface 16 in the mold, as a result of dimensional error or drooping caused by abrasion, corrosion, and the like. The round shape may be transferred to the molded product as the shape of the second reflective surface 16. Reflected light from the round shape such as this is stray light that differs from normal reflected light, such as the monitor light. Therefore, the reflected light is preferably not incident on the light-emitting element 7 and the light-receiving element 8. Thus, in expectation of the reflection of the laser light La of the light-emitting element 7 by the round shape such as this, the size of the light-receiving element 8, the position of the light-emitting element 7, spacing between the first reflective surface 14 and the second reflective surface 16, and the like may be designed such that the reflected light is not incident on the light-receiving element 8 and the light-emitting element 7.

Figure 6:
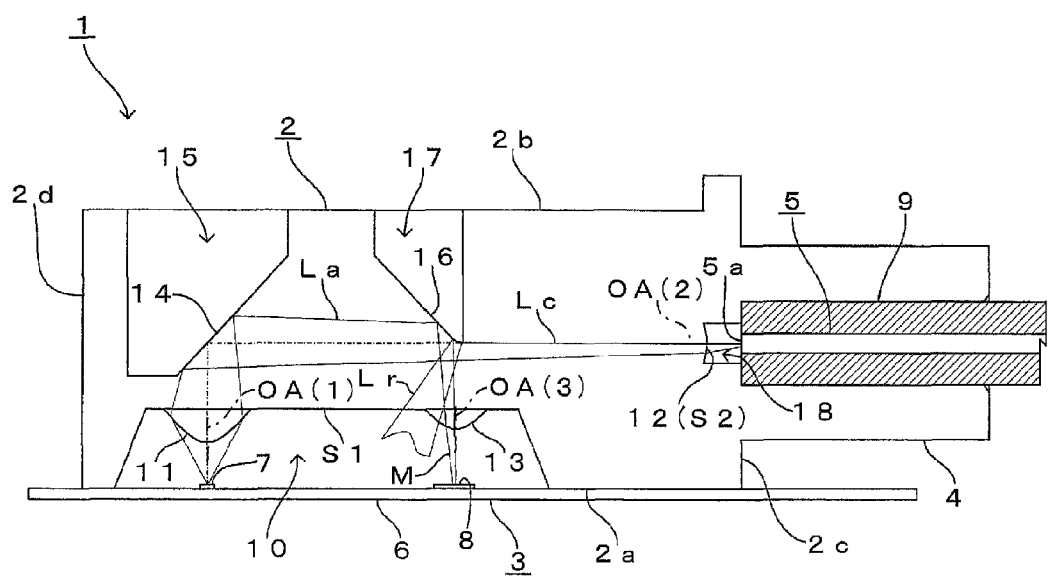
[FIG. 6] A configuration diagram of a third variation example of the present invention.

As a result of a configuration such as this, as shown in FIG. 6, even when the round shape is formed in a lower end portion of the second reflective surface 16, reflected light Lr from the round shape can be prevented from being incident on the light-receiving element 8 and the light-emitting element 7 with certainty.

The present invention is not limited to the above-described embodiment and may be variously modified to the extent that features thereof are not compromised.

EXPLANATIONS OF LETTERS OR NUMERALS 1 optical module
2 optical receptacle
3 photoelectric conversion device
5 optical fiber
5a end face
7 light-emitting element
8 light-receiving element
14 first reflective surface
16 second reflective surface

The invention claimed is:

1. An optical receptacle that is disposed between a photoelectric conversion device and an optical fiber, in which photoelectric conversion device a light-emitting element and a light-receiving element that receives monitor light for monitoring light emitted from the light-emitting element are mounted on a substrate, said optical receptacle being capable of optically coupling the light-emitting element and an end face of the optical fiber, and comprising:

a first surface of an optical receptacle main body on which the light from the light-emitting element is incident and from which the monitor light is emitted towards the light-receiving element;

a first reflective surface that is disposed on a side opposite to the first surface such as to have a predetermined slope angle in relation to the first surface and such that the light of the light-emitting element that has been incident on the first surface is incident thereon, and that reflects the incident light of the light-emitting element;

a light separating section having a second light reflective surface that is disposed on the side opposite to the first surface facing the light-emitting element and is disposed towards a reflection direction of the light of the light-emitting element away from the first reflective surface, and that divides the reflected light of the light-emitting element that has been reflected by the first reflective surface into (a) the monitor light that advances towards the light-receiving element through the first surface and (b) light that advances towards the end face of the optical fiber to be coupled therewith, said second light reflective surface having a slope angle such that when the light-emitting element reflected from the first reflective surface strikes the second light reflective surface at an incident angle which is smaller than a critical angle on the second reflective surface, the striking light-emitting element is totally reflected by the second light reflective surface; and a second surface of the optical receptacle main body from which the light to be coupled with the end face of the optical fiber that has been separated by the light separating section is emitted towards the end face of the optical fiber, wherein the light reaching the second surface from the first reflective surface is such that a traveling direction between the first reflective surface and the second surface is maintained at the reflection direction of the first reflective surface, and the second light reflective surface is disposed such as to have a predetermined slope angle in relation to the first surface and such that a portion of the reflected light of the light of the light-emitting element that has been reflected by the first reflective surface is incident thereon, wherein the portion of the light incident on the second reflective surface is reflected by the second reflective surface as the monitor light, and another portion of the reflected light of light of the light-emitting element that has been reflected by the first reflective surface and has not been incident on the second reflective surface is advanced towards the second surface.

2. The optical receptacle according to claim 1, wherein:
the second reflective surface is composed of a sloped surface of the optical receptacle main body having a slope angle such that the portion of light is incident at an angle of incidence greater than the critical angle, and totally reflects the incident portion of light as the monitor light.

3. The optical receptacle according to claim 1, wherein:
the second reflective surface is formed by the sloped surface of the optical receptacle main body being coated by a reflective film.

4. The optical receptacle according to claim 1, wherein:
the first reflective surface is composed of a sloped surface of the optical receptacle main body having a sloped angle such that the light of the light-emitting element that has been incident on the first surface is incident at an angle of incidence greater than the critical angle, and totally reflects the incident light of the light-emitting element.

5. The optical receptacle according to claim 1, wherein:
the first reflective surface is formed by the sloped surface of the optical receptacle main body being coated with a reflective film.

6. The optical receptacle according to claim 1, wherein:
a first lens face for enabling the light of the light-emitting element to be incident towards the first reflective surface is formed on the first surface; and
a second lens face for emitting the light to be coupled with the end face of the optical fiber towards the end face of the optical fiber is formed on the second surface.

7. The optical receptacle according to claim 6, wherein:
a third lens face for emitting the monitor light towards the light-receiving element is formed on the first surface.

8. An optical module comprising:
an optical receptacle according to claim 1, said optical receptacle being disposed between a photoelectric conversion device and an optical fiber; and
the photoelectric conversion device in which a light-emitting element and a light-receiving element that receives monitor light for monitoring light emitted from the light-emitting element are mounted on a substrate.

9. An optical module comprising:
an optical receptacle according to claim 1, said optical receptacle being disposed between a photoelectric conversion device and an optical fiber; and
the photoelectric conversion device in which a light-emitting element and a light-receiving element that receives monitor light for monitoring light emitted from the light-emitting element are mounted on a substrate, wherein
an optical receptacle main body is formed by a resin material, and
in expectation of reflection of the light of the light-emitting element by a round shape that may be formed in an end portion of a second reflective surface of the optical receptacle on a first surface side, to prevent the reflected light from being incident on a light-receiving element and the light-emitting element of the photoelectric conversion device, the size of the light-receiving element, the position of the light-emitting element, and spacing between a first reflective surface and the second reflective surface of the optical receptacle are set.

10. The optical module according to claim 9, wherein:
the first reflective surface is composed of a sloped surface of the optical receptacle main body having a sloped angle such that the light of the light-emitting element that has been incident on the first surface is incident at an angle of incidence greater than the critical angle, and totally reflects the incident light of the light-emitting element.

11. The optical module according to claim 9, wherein:
the first reflective surface is formed by the sloped surface of the optical receptacle main body being coated with a reflective film.

12. The optical module according to claim 9, wherein:
a first lens face for enabling the light of the light-emitting element to be incident towards the first reflective surface is formed on the first surface; and
a second lens face for emitting the light to be coupled with the end face of the optical fiber towards the end face of the optical fiber is formed on the second surface of the optical receptacle.

13. The optical module according to claim 12, wherein:
a third lens face for emitting the monitor light towards the light-receiving element is formed on the first surface.

14. The optical module according to claim 1, wherein:
the second reflective surface is in contact with a reflective film made of Au, Ag, or Al.

* * * * *